United States Patent
Mita et al.

[11] Patent Number: 5,841,212
[45] Date of Patent: Nov. 24, 1998

[54] PERMANENT MAGNET FIELD TYPE ROTATING MACHINE

[75] Inventors: Masahiro Mita; Takashi Sasaki, both of Fukaya, Japan

[73] Assignee: Hitachi Metals, Ltd., Tokyo, Japan

[21] Appl. No.: 833,624

[22] Filed: Apr. 8, 1997

[30] Foreign Application Priority Data

Apr. 15, 1996 [JP] Japan .................................... 8-092631

[51] Int. Cl.⁶ .................................................. H02K 21/14
[52] U.S. Cl. ........................... 310/156; 310/42; 310/261; 29/598; 148/101; 148/121
[58] Field of Search ..................... 310/156, 261, 310/265, 269, 42; 29/598; 148/101, 121

[56] References Cited

U.S. PATENT DOCUMENTS

| | | | |
|---|---|---|---|
| 4,312,684 | 1/1982 | Chraplyvy et al. | 141/121 |
| 4,347,086 | 8/1982 | Chraplyvy et al. | 141/121 |
| 4,613,842 | 9/1986 | Ichiyama et al. | 310/216 |
| 5,074,929 | 12/1991 | Bradley et al. | 148/101 |
| 5,296,773 | 3/1994 | El-Antably et al. | 310/261 |
| 5,492,571 | 2/1996 | Frosch et al. | 148/103 |
| 5,492,572 | 2/1996 | Schroeder et al. | 148/101 |
| 5,631,093 | 5/1997 | Perry et al. | 148/101 |

FOREIGN PATENT DOCUMENTS

| | | | |
|---|---|---|---|
| 61-164207 | 7/1986 | Japan | H01F 7/02 |
| 01-174256 | 7/1989 | Japan | H02K 37/04 |
| A 6-311677 | 4/1993 | Japan | H02K 1/27 |
| 6-245418 | 9/1994 | Japan | C22C 38/00 |
| 7-11397 | 1/1995 | Japan | C22C 38/00 |
| 7-163073 | 6/1995 | Japan | H02K 1/27 |

*Primary Examiner*—Thomas M. Dougherty
*Assistant Examiner*—B. Mullins
*Attorney, Agent, or Firm*—Finnegan, Henderson, Farabow, Garrett & Dunner, L.L.P.

[57] ABSTRACT

Disclosed is a permanent magnetic field type rotating machine. The rotor core is made of a single chemical composition material comprising ferromagnetic and nonmagnetic zones. The nonmagnetic zones consists of a remolten and solidified metal structure and of a merely heated and cooled metal structure, and are present at portions of the rotor core where leakage flux is produced.

6 Claims, 10 Drawing Sheets

PERMANENT MAGNET FIELD TYPE ROTATING MACHINE

BACKGROUND OF THE INVENTION

The present invention relates to a rotating machine such as an electric motor or a generator.

Conventionally such rotating machines have been of the induction type which is suitably connected to a three-phase current. In recent years, however, brushless DC-type rotating machines with utilization of permanent magnet fields and reluctance type rotating machines are increasing for high power applications due to an appearance of a high capacity permanent magnet and developments in the computer-aided magnetic field analysis technology and the power electronics, while conventionally the induction type rotating machines have been predominantly used in such high power applications. The brushless DC-type rotating machines and the reluctance type rotating machines can have higher operational efficiency and cooling efficiency than the induction type rotating machines since rotors thereof do not require to receive current.

FIG. 10 shows an essential part of a conventional brushless DC motor in a cross sectional view, which has a surface magnet type rotor 60.

In FIG. 10, a plurality of permanent magnets 1 are attached to the outer periphery of a rotor core 2 at a predetermined interval with one another. The permanent magnets 1 each having an arc segment shape are radially magnetized. The rotor core 2 is mounted on a rotor shaft 8 to form a surface magnet type rotor 60. A stator core 3 is opposite to the rotor 60 with an air gap 9 therebetween. The reference numeral 4 denotes a stator winding and 20 a stator. Magnetic flux A from the magnetic pole N of a permanent magnet 1a attached to the outer periphery of the rotor 60 forms a closed loop which passes through a portion of the respective stator cores 3a and 3b, two air gap portions 9, a permanent magnet 1b having reverse polarity to the permanent magnet 1a and the rotor core 2, and returns to the permanent magnet 1a at the magnetic pole S as indicated by arrows. When a current passes through the stator winding 4, the rotor 60 rotates under torque produced by the armature interaction between the rotor 60 and the stator winding.

However, in the case where the rotor 60 rotates at a high or has a large diameter, there is a risk that the permanent magnets 1 separate from the rotor core 2 under a large centrifugal force, since the permanent magnets 1 are secured to the circumferential surface of the rotor core 2 with utilization of an adhesive, for example.

On the other hand, there has been a conventional surface magnet type rotor 70 with a cylindrical cover as shown in FIG. 11, in which the cylindrical cover 5 is provided to surround the outer surfaces of permanent magnets 1 each having an arc segment form in order to support a centrifugal force which acts on the permanent magnets 1 so as to prevent them from separating from a rotor core 2. In the drawing, numeral 8 denotes a rotor shaft. The cylindrical cover 5 may be made from a ferromagnetic or nonmagnetic material, such as an integral metallic member or a member made of wound artificial fibers including carbon fibers. Such covers have been brought into practical use in air conditioner motors, for example.

With respect to the separation problem of the permanent magnets, another example rotor is shown FIG. 12, which is a conventional internal magnet type rotor 80 comprising a rotor core 2 in which permanent magnets 1 are embedded. When the rotor 80 rotates, a centrifugal force acting on the permanent magnets 1 is born by the outer periphery region of the rotor core 2.

If the cylindrical cover 5 in FIG. 11 is made of a nonmagnetic material, the space between the rotor 70 and a stator (not shown), that is, an air gap 9 increases by the thickness of the cylindrical cover 5, thus reducing the number of effective lines of magnetic force from the permanent magnets 1, namely, the amount of effective magnetic flux as compared with the surface magnet type rotor 60 in FIG. 10 in which the surfaces of the permanent magnets 1 directly face to the air gap 9.

If the cylindrical cover 5 of FIG. 11 is made of a ferromagnetic material, leakage flux C occurs, which starts from the permanent magnets 1a and reaches to the permanent magnet 1b which has an opposite polarity to the permanent magnet 1a through the cylindrical cover 5. The leakage flux C does not intersect stator windings (not shown), thus it does not contribute to torque of the motor or power generation in a generator. In such rotor 70, the number of effective lines of magnetic force is also smaller than that in the surface magnet type rotor 60 of FIG. 10 in which the surfaces of the permanent magnets 1 directly face to the air gap 9.

In the case of the internal magnet type rotor 80 of FIG. 12, the magnetic flux from the permanent magnets 1 must be taken out toward the stator (not shown) through the outer surface of the rotor 80 and the air gap 9. From this, the rotor core 2 is inevitably required to be ferromagnetic. In such rotor core, so-called leakage flux B is produced around the magnetic poles of the permanent magnets 1 so that the number of effective lines of magnetic force from the permanent magnets 1 is reduced as compared with that of the surface magnet type rotor 7 having the cylindrical cover 5 of FIG. 11.

FIG. 13 is a cross sectional view of an essential portion of a conventional rotor used in a reluctance type rotating machine.

A reluctance type rotor 90 of FIG. 13 comprises a rotor core 2 which consists of alternately layered magnetic material layers 6 and nonmagnetic material layers 7 and which is mounted on a rotor shaft 8. When a rotating and alternating magnetic field acts on the rotor 90 from a stator side (not shown) through an air gap 9, the flux of the rotating magnetic field is liable to pass the magnetic material layer 6 indicated by axis d of the rotor 90 but hardly pass along a direction crossing the alternate magnetic material layers 6 and nonmagnetic material layers 7 indicated by axis g. Considering the relationship between a winding at any position of the stator (not shown) and the rotor 90, there will occur a difference in inductance according to a rotating angle of the rotor 90, which is a principle of the reluctance motor and the like. Herein, a rotor of the reluctance motor is referred to as a inner magnetic barrier type multilayered rotor, which comprises the rotor core 2 (FIG. 13) and consists of alternately superimposed magnetic and nonmagnetic material layers 6 and 7, and which is mounted on the rotor shaft 8. With regard to producing a conventional inner magnetic barrier type multilayered rotor, there are proposed a way disclosed in JP-A-6-311677 in which magnetic and nonmagnetic plates 6 and 7, having a predetermined form, respectively, are alternately superimposed and combined with one another by screws or the like, and another way in which a plurality of disks, each of which is made from a silicon steel sheet and has a plurality of openings formed in other than a peripheral region of the disk, are superimposed, the openings being of nonmagnetic zones. None of such rotor cores for the reluctance type rotor has good reliability in mechanical strength and good fabricability.

Composite magnetic materials, on the other hand, have been used to complement mechanical strength and increase magnetic efficiency. Disclosed in, for example, JP-A-7-11397, is a composite material in which portions differing in magnetic properties (magnetic and nonmagnetic portions), that is, in microstructure, coexist with each other. JP-A-6-245418 discloses a motor using such a material, in which an alloy steel is processed to have mechanical deformation and thermal hysteresis so that the magnetic properties thereof differ from portion to portion. JP-A-6-245418 describes that the cylindrical cover 5 of FIG. 11 is arranged so that the lines of magnetic force from the permanent magnets 1 are effectively taken out of the rotor 70 by providing nonmagnetic portions 663 radially outside between the magnetic poles of the permanent magnets 1 and ferromagnetic portions 650 radially outside the permanent magnets. The nonmagnetic portions 663 are made by heating and subsequent cooling them locally in the range from the austenite transformation temperature or higher to below the melting point.

The maximum magnetic flux density (Bs) of the composite, magnetic material disclosed in JP-A-7-11397 is 0.8 tesla (T) as measured at a magnetic field intensity of 3980 A/m (50 Oe). For a rotor including permanent magnets with a residual magnetic flux density (Br) of 0.8 T or more, if the maximum magnetic flux density (Bs) of the rotor core constituting the rotor is less than 0.8 T, the flux from the permanent magnets is magnetically saturated at the rotor core, thus preventing effective flux from being efficiently taken out to the outer surface of the rotor, so that the magnetic efficiency of the rotor is significantly reduced. For the above reason, magnets having a residual magnetic flux density of 1.2 or more, especially Nd—Fe—B anisotropic sintered magnets at such residual magnetic flux density levels must have a maximum magnetic flux density of 1.2 T or more, preferably 1.3 T or more as composite, magnetic materials for rotating machines.

Rotating machines, especially for automobiles must meet stringent low temperature requirements including a minimum ambient temperature range of lower than at least −40° C. or less.

The maximum magnetic flux density of the composite magnetic material described above can be set to 1.3 T or more by reducing the chromium or nickel content thereof. However, there is a problem that a reduction in chromium or nickel content, leads to lack of austenite stabilizing elements (such as nickel) and thus the austenitic phase of the nonmagnetic portions in the composite magnetic material is unstable and at the above low temperature range transformed to another magnetic phase around minus(−) 10° C.

FIG. 14 is a phase diagram of a modified Fe—Cr binary system at 0.6 wt % carbon. As shown in the diagram, the austenite phase is present at a high temperature range of from about 700° C. to not lower than 900° C. at a Cr content range of 0 to 15 wt %. A nonmagnetic material composed of austenite phases can be obtained by heating an alloy composed of 0.6 wt % C, 0 to 15 wt % Cr, and balance of Fe and unavoidable impurities at about 1000° C. and then rapidly cooled the alloy at such a cooling rate that austenite phase can be kept without occurrence of ferrite phase.

Below is described a method of forming a rotor core that includes both ferromagnetic and nonmagnetic portions, produced by heating, for example, stainless steel JIS SUS420J2 locally and then cooling it. Martensitic stainless steel JIS SUS420J2 comprises 0.26 to 0.40 wt % C, not more than 1.00 wt % Si, not more than 1.00 wt % Mn, not more than 0.040 wt % P, not more than 0.030 wt % S, 12.00 to 14.00 wt % Cr and unavoidable impurities. If the stainless steel is subjected to a heat treatment of heating at 700° to 900° C. for from one to two hours followed by gradual cooling, as usually conducted, in order to improve ferromagnetic properties, it has a composite structure (ferromagnetic structure) at the room temperature, which consists of ferrite phase and segregated carbides. The segregated carbides, even if heated to a temperature of not lower than the austenite transformation temperature and lower than the melting point of the stainless steel, do not readily dissolve into ferrite phase. Thus, with regard to a rotor core which consists of a ferromagnetic portion and a nonmagnetic portion and which is produced from the JIS SUS420J2 material, which comprises carbon depleted portions (namely, portions where carbides are segregated) (carbon being an austenite stabilizing element), by subjecting it to a heat treatment of partially heating it followed by rapid cooling to obtain a nonmagnetic portion, namely the heat treatment being of partially heating the material to a temperature range of from not lower than the austenite transformation temperature to lower than the melting point and subsequently rapidly cooling it, if such rotor core is applied to a rotating machine of an automobile, which is exposed to a low temperature, for example minus(−) 40° C., the austenite phase of the nonmagnetic portion, which is partially formed in the rotor core, is transformed to ferromagnetic ferrite phase. This causes the nonmagnetic portions of the rotor core to loose their capacity of restraining leakage flux. Merely heating JIS SUS420J2 alloy partially to a temperature range of not lower than the austenite transformation temperature and lower than its melting point and subsequently cooling the alloy cause the relative permeability ($\mu$s) of partially formed nonmagnetic portions to be considerably high at around minus(−) 40° C. Thus the magnetic efficiency of motors and generators using parts made of thus heat treated JIS SUS420J2 alloy extremely decreases at around minus(−) 40° C.

SUMMARY OF THE INVENTION

Under such technical background stated above, it is an object of the present invention to provide a rotating machine having a fully high magnetic efficiency at least minus(−) 40° C.

According to a first aspect of the invention, there is provided a permanent magnet field type rotating machine comprising an inner magnet type rotor whose rotor core has a plurality of permanents magnets mounted therein, wherein the rotor core is made of a single chemical composition material comprising ferromagnetic and nonmagnetic zones, the nonmagnetic zones consisting of a remolten and solidified metal structure and of a merely heated and cooled metal structure (or heat-affected structure), and being present at portions of the rotor core where leakage flux is produced. According to such rotor core, the magnetic efficiency of the rotating machine can be kept good in a low temperature range in the case where the nonmagnetic zones comprise not less than 30 vol % remolten and solidified metal structure.

According to a second aspect of the invention, there is provided a permanent magnet field type rotating machine having a surface magnet type rotor which comprises a rotor core, permanent magnets mounted on the peripheral surface of the rotor core and a cylindrical cover which covers the permanent magnets, wherein the cylindrical cover is made of a single chemical composition material comprising ferromagnetic and nonmagnetic zones, the nonmagnetic zones consisting of a remolten and solidified metal structure and of a merely heated and cooled metal structure (or heat-affected structure), and being present at portions of the cylindrical cover where leakage flux is produced. According to such cylindrical cover, the magnetic efficiency of the rotating machine can be kept good in a low temperature range in the case where the nonmagnetic zones comprise not less than 30 vol % remolten and solidified metal structure.

According to a third aspect of the invention, there is provided a reluctance type rotating machine having a rotor which comprises a rotor core being made of a single chemical composition material comprising ferromagnetic and nonmagnetic zones, the nonmagnetic zones consisting of a remolten and solidified metal structure and of a heated and cooled metal structure (or heat-affected structure). According to such rotor core, the magnetic efficiency of the rotating machine can be kept good in a low temperature range in the case where the nonmagnetic zones comprise not less than 30 vol % remolten and solidified metal structure.

In the present invention, known martensitic stainless steel and/or ferritic stainless steel can be used as a composite structural material, which comprises ferromagnetic and nonmagnetic zones, for the rotor core.

If it is acceptable that the nonmagnetic zones locally formed in the ferromagnetic zone are stable at a low temperature down to minus(-) 40° C., martensitic stainless steels, such as JIS SUS420J2 and JIS SUS403, can be used as a material for the rotor core of the invention. The martensitic stainless steel of JIS SUS420J2 consists of 0.26 to 0.40 wt % C, not more than 1.00 wt % Si, not more than 1.00 wt % Mn, not more than 0.040 wt % P, not more than 0.030 wt % S, not more than 0.60 wt % Ni, 12.00 to 14.00 wt % Cr, and balance of Fe and unavoidable impurities.

In the case where carbon is a primary stabilizer at a low temperature range for the rotor core steel, an alloy steel can be used, which are similar in chemical composition to JIS SUS440A which consists of 0.40 to 1.20 wt % C, not more than 1.00 wt % Si, not more than 1.00 wt % Mn, not more than 0.04 wt % P, not more than 0.03 wt % S, not more than 0.60 wt % Ni, 12.00 to 14.00 wt % Cr, and balance of Fe and unavoidable impurities.

A known magnetic stainless steel can be used for the rotor core, which comprises an increased amount of Ni as a stabilizer for the austenite phase instead of increasing carbon since an exceeding amount of carbon causes the rotor core steel liable to corrode and whose chemical composition is, for example, 0.26 to 0.70 wt % C, not more than 1.00 wt % Si, not more than 1.00 wt % Mn, not more than 0.40 wt % P, not more than 0.03 wt % S, not more than 8.00 wt % Ni, 12.00 to 14.00 wt % Cr, and balance of Fe and unavoidable impurities.

Putting an importance to the low-temperature stability of the nonmagnetic zones of the invention rotor core, it is effective to considerably increase carbon and nickel contents in the rotor core steel. In such case, a known magnetic stainless steel can be used, which comprises not more than 1.20 wt % C, not more than 1.00 wt % Si, not more than 1.00 wt % Mn, not more than 0.40 wt % P, not more than 0.03 wt % S, not more than 8.00 wt % Ni, 12.00 to 14.00 wt % Cr, and balance of Fe and unavoidable impurities.

In the present invention, the nonmagnetic zones (remolten/solidified and heated/cooled zones) can be produced by a heating means of laser beam, electronic beam, high-temperature plasma, high frequency induction heating or the like. However the heating means is not limited to those raised above and may be known locally heating means.

According to the present invention, a rotating machine, which have a high efficiency and a high reliability in mechanical strength and so on, can be produced with utilization of the rotor core made of the material which comprises ferromagnetic and nonmagnetic zones, the ferromagnetic having a fully large maximum magnetic flux density (Bs) and the nonmagnetic zones, which has relative permeability of not greater than 2 $\mu$s, being stable at least an environment temperature at least down to about minus(-) 40° C.

PREFERRED EMBODIMENTS OF THE INVENTION

Figure 1:
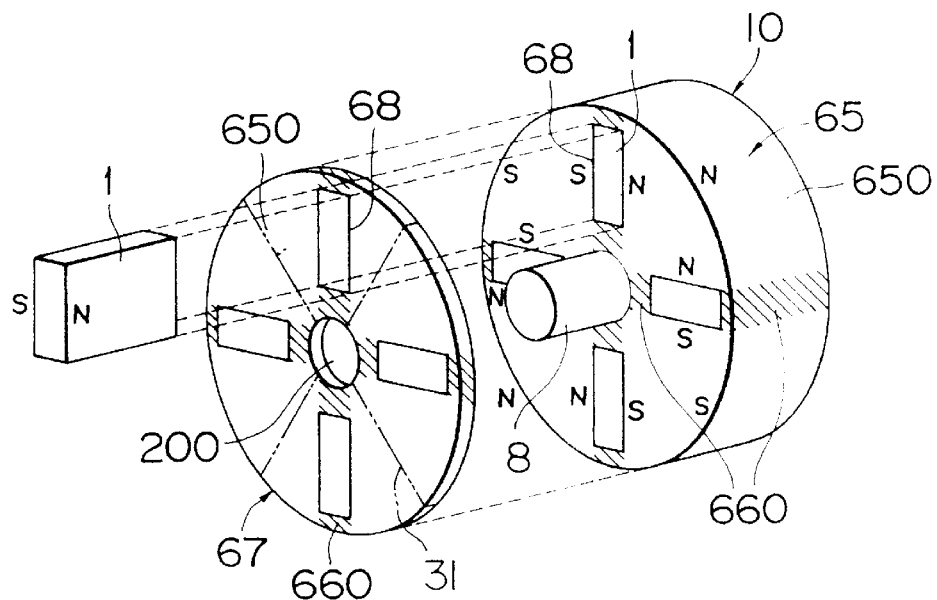
FIG. 1 is a perspective view showing an essential portion of a rotor of the invention.

In FIG. 1, a rotor core 65 consists of a plurality of thin plates 67 which are superimposed with one another in the longitudinal direction and which are mounted on a rotor shaft 8. In the rotor core 65, shaded portions 660 show nonmagnetic zones consisting of a remolten/solidified metal structure and a heated/cooled metal structure, while portions 650 are ferromagnetic zones. As described later, the both type portions 660 and 650 were confirmed that they have substantially the same chemical composition which varies within a range of error of the thin plate material. In the view point of stability of the portions 660 at a low temperature range of around minus(−) 40° C., preferably they comprise not less than 30 vol % remolten/solidified structure. The portions 650 are provided with magnetic poles N and S at the periphery regions, respectively. The rotor core 65 (thin plates 67) has four through holes 68 to which permanent magnets 1 are embedded. The permanent magnets 1 are fitted in the through holes 68 and bonded to the rotor core 65 with an epoxy system adhesive, for example. As shown in the drawings, the permanent magnets 1 have magnetic poles N and S, and total four magnetic poles N and S are provided to the periphery region of the rotor 10 at a regular interval therebetween via nonmagnetic zones 660.

Figure 2:
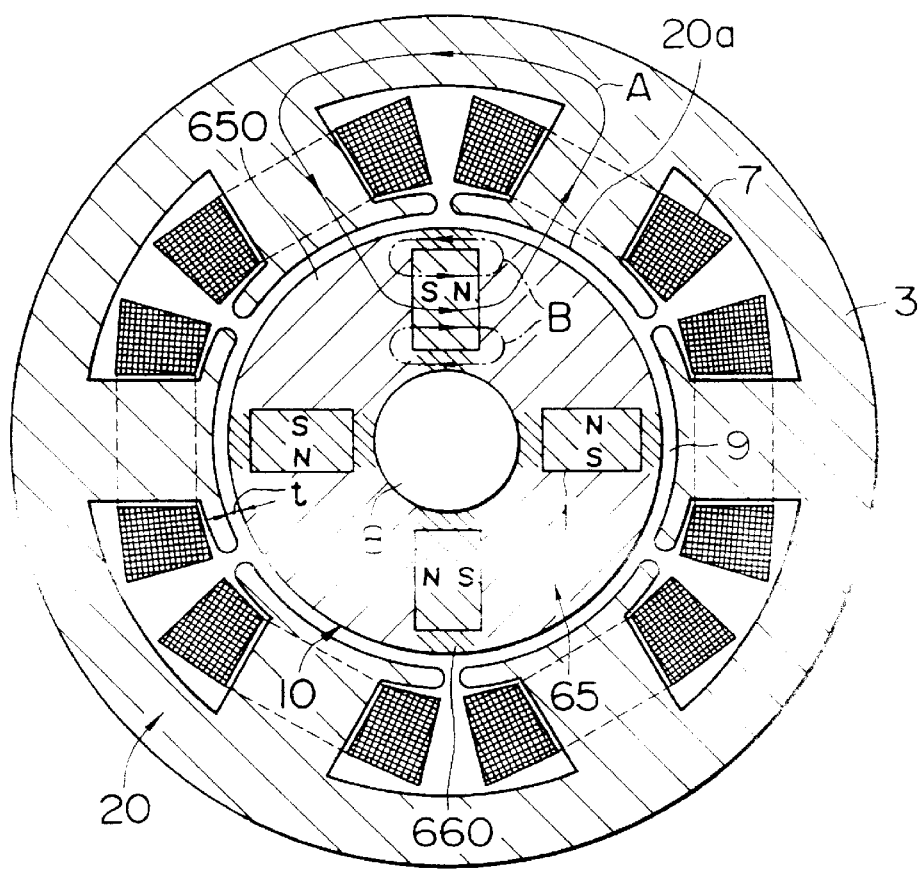
FIG. 2 is a cross sectional view showing an essential portion of a rotating machine of the invention.

FIG. 2 is a cross sectional view of an essential portion of a motor having the inner magnet type rotor (FIG. 1). The shaded nonmagnetic zones 660 are arranged at the positions where leakage flux occur in the rotor core 65, so that no short-circuits of flux B, shown by phantom lines, are produced resulting in little leakage flux. Flux A schematically represents an effective flux which contributes to output of the motor. In FIG. 2, the leakage flux B will be produced if the portions 660 are not present. Thus the nonmagnetic zones 660 can be formed at any position in the rotor core 65, which can interfere the supposed leakage flux B. The rotor core 65 of the rotor 10, which has an outer diameter of 74 mm and an axial thickness of 23 mm, comprises a center hole 200 having a diameter of 30 mm for the rotor shaft 8 and rectangular through holes 68 to which the permanent magnets 1 are inserted, the permanent magnets 1 having 3.5 mm of thickness in the magnetization direction, a width of 16 mm in the radial direction and a length of 23 mm in the axial direction. Any distances at the minimum between the respective through holes 68, and the outer surface and the center hole 200 of the rotor core 65 are 3 mm, respectively. The thin plate is 0.45 mm thick. A minimum distance t of 3 mm is provided between a stator 20 and the rotor 10, by which the motor is constituted. Such minimum distance of 3 mm can be achieved by minimizing the rotating eccentricity of the rotor 10 under a good dimensional accuracy condition in which the eccentricity of the outer periphery of the rotor 10 is not more than 0.05 mm and the perpendicularity or deflection of portions 20a of the stator core 20 is not more than 0.05 mm. The permanent magnets 1 are of sintered anisotropic magnets of Nd—Fe—B (a trade name of HS-32BV produced by Hitachi Metal Corporation) having a residual magnetic flux density (Br) of 1.15 T were used.

Figure 5:
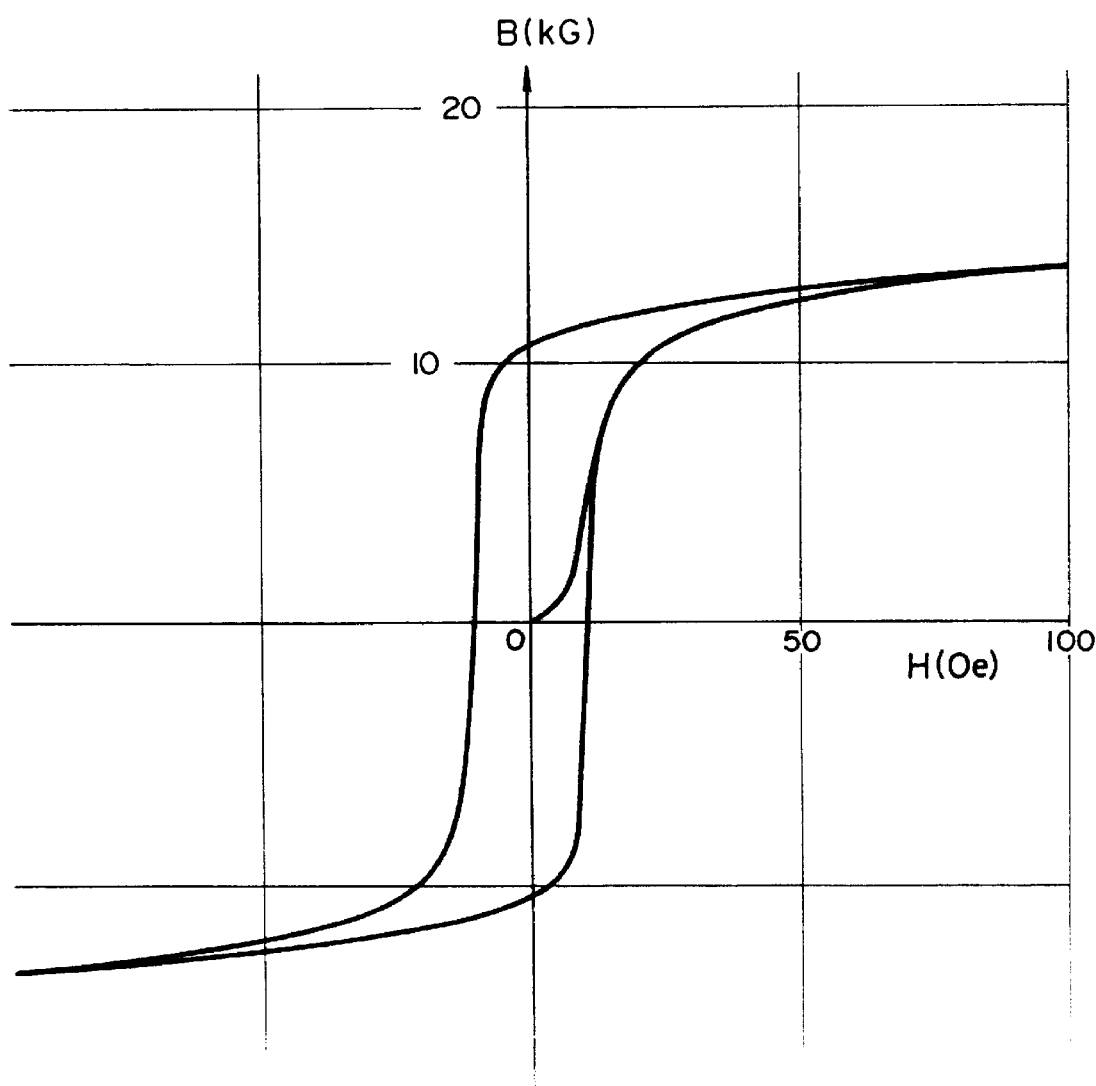
FIG. 5 shows a magnetic property (B-H curve) of a ferromagnetic portion of a rotor core according to the invention, which has 565 of maximum magnetic permeability ($\mu_s$) 10.5 (Oe) of coercive force (Hc), and magnetic flux density of $B_{50}$ 12.3 (kG) (at 50 Oe) and $B_{100}$ 13.6 (kG) (at 100 Oe), and in which the unit of "B" is "kG" and the unit of "H" is "Oe"

The rotor core 65 is formed from, for example, a martensitic stainless steel consisting of 0.6 wt % C (carbon), 13 wt % Cr, and balance of Fe and unavoidable impurities. The stainless steel is annealed in a magnetic field to provide it with ferromagnetism, thereby it can have a maximum saturation magnetic flux density (Bs) of 1.4 T and a coercive force (Hc) of 10 Oe at 20° C., as shown by the B-H characteristics in FIG. 5, which are enough to the material for the rotor core 65.

A sheet made of such material, which has the above ferromagnetic properties and a size of 100 mm×100 mm×1 mm, for example, is cut to produce the thin plates 67 (FIG. 1). The obtained respective thin plates 67 is locally heated by means of $CO_2$ laser beam in a condition of 3.5 kw output and 2 m/minute sweeping speed to melt and subsequently cool predetermined areas to solidify so as to produce the nonmagnetic portions 660. The formed nonmagnetic zones 660 were 2 to 4 mm wide and substantially straight. Hereinafter, the way of heating an object to melt and subsequently cooling it to solidify is referred to as "remelting heat treatment". The heat treatment is carried out in the air and argon gas is blown to the front surface of the thin plate from the laser head and to the opposite surface thereof.

Figure 7:
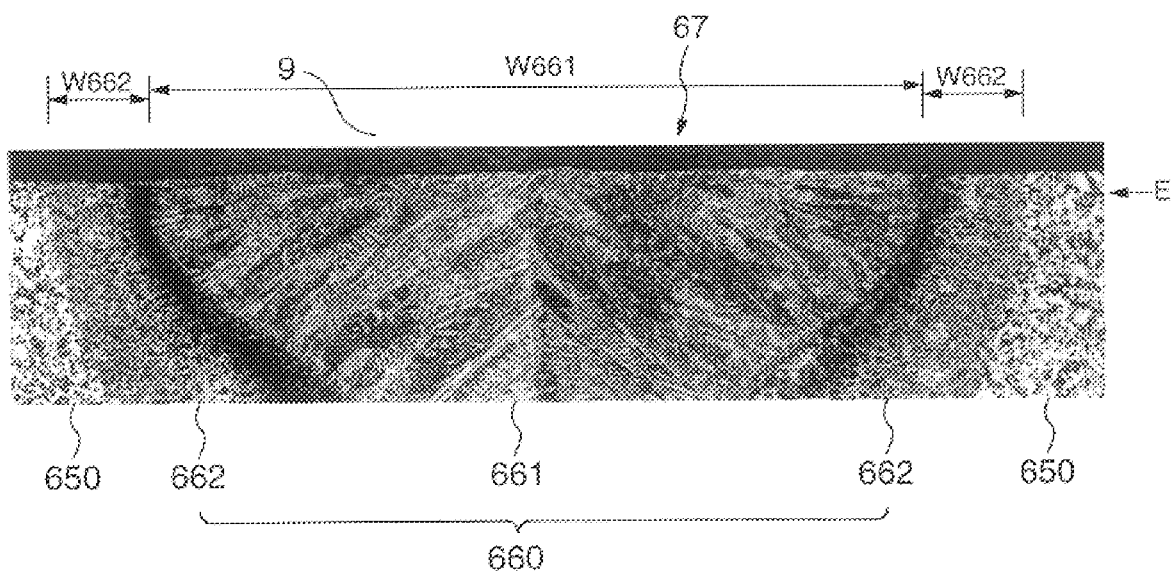
FIG. 7 is a photograph of a remolten/solidified metal structure of the invention.

FIG. 7 shows a radial cross sectional view of a nonmagnetic zones 660 formed on the outer peripheral surface of a thin plate 67. In FIGS. 1 and 7, the same numerals indicate the relevant objects.

As shown in FIG. 7, a nonmagnetic zone 660 consists of a remolten/solidified zone 661 which has a dendrite structure, and heat affected zones 662 adjacent to the remolten and solidified zone. The heat-affected zones 662 are formed by heating to a temperature not lower than the austenite transformation temperature and lower than the melting point of the ferromagnetic base material 65. In FIG. 7, the volumetric rate of the remolten/solidified zone 661 to the heat-affected nonmagnetic zones 662 is 70% to 30%, the heat-affected zones 662 being formed by heating below the melting point and thereafter cooled.

Next, a comparison test was conducted with respect to the nonmagnetic zone 660. In the test, a portion of the thin plate 67, which corresponds to the nonmagnetic zone 660, was heated under another heat treatment condition which was different from the remelting heat treatment and which was of heating with utilization of $CO_2$ laser beam to a temperature not lower than the austenite transformation temperature and lower than the melting point of the thin plate material in an argon gas atmosphere and of subsequent cooling in the argon gas atmosphere to form a nonmagnetic zone (corresponding to the zone 663 in FIG. 11) which was not melted. Hereinafter such heat treatment is referred to as "non-molten heat treatment" and comprises, for example, heating the relevant portion to a heat treatment temperature of 1100° C. for one second.

Figure 9:
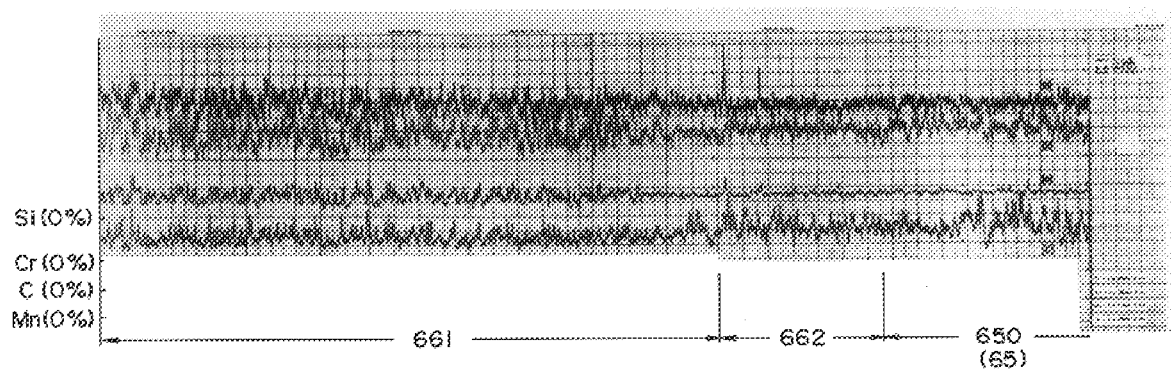
FIG. 9 shows the results of line analysis of a nonmagnetic portion of a rotor core according to the invention.
Figure 10:
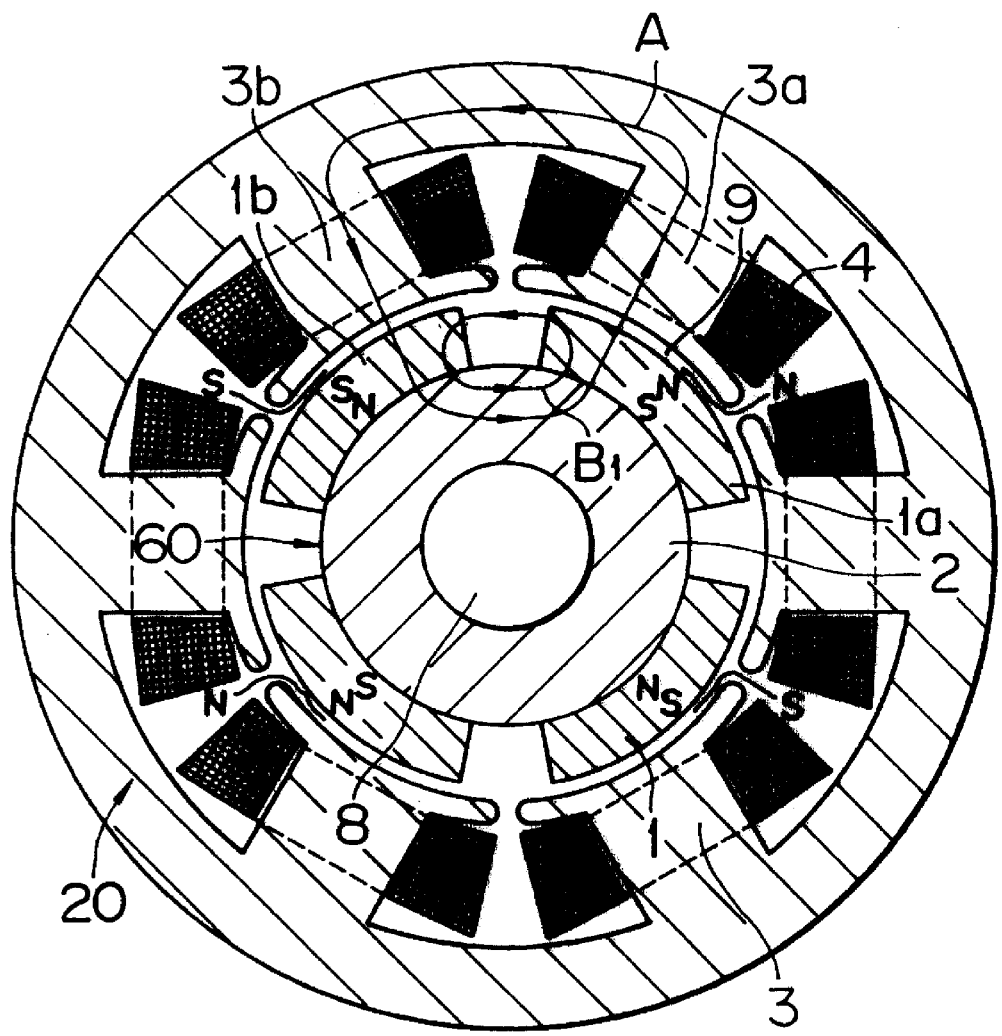
FIG. 10 is a cross sectional view of an essential portion of a convention rotor.

The zones 660 formed in the thin plate 67 (FIG. 7) with regard to the cross section thereof were subjected to an electron beam analysis with utilization of an electron beam microanalyzer (EPMA) under a scanning condition of 15 kV, 0.1 $\mu$A and a beam diameter of 5 $\mu$m, in which the scanning was performed on the ferromagnetic zone 650 (namely, the base material 65), the heat-affected zones 662 and the remolten/solidified zone 661 in this order as indicated by an arrow E (FIG. 7). The result of the electron beam analysis is shown in FIG. 9. It is noted that the electron beam analysis is performed with regard to amounts of indispensable elements of carbon and Cr, and unavoidable impurity elements of Si and Mn. In FIG. 9, the abscissa indicates scanning positions of the specimen of the thin plate 67 and the left side ordinate indicates the respective elements of carbon, Cr, Si and Mn.

From the graph of FIG. 9, it is confirmed that there are no significant differences in amounts of carbon, Cr, Si and Mn between the ferromagnetic zone 650 (the base material 65), the heat-affected zones 662 and the remolten/solidified zone 661 and that such respective differences is within a variance range of that of the base material 65 and thus the three zones have substantially the same chemical composition.

Further, the zone 660 subjected to the "remelting heat treatment" and the corresponding portion subjected to the "non-melting heat treatment" (which corresponds to the portion 663 in FIG. 11) were examined at room temperature of 20° C. by means of the X-ray diffraction method with respect to those crystal structures. The result was that the both portions or zones have a nonmagnetic austenite structure.

Figure 6:
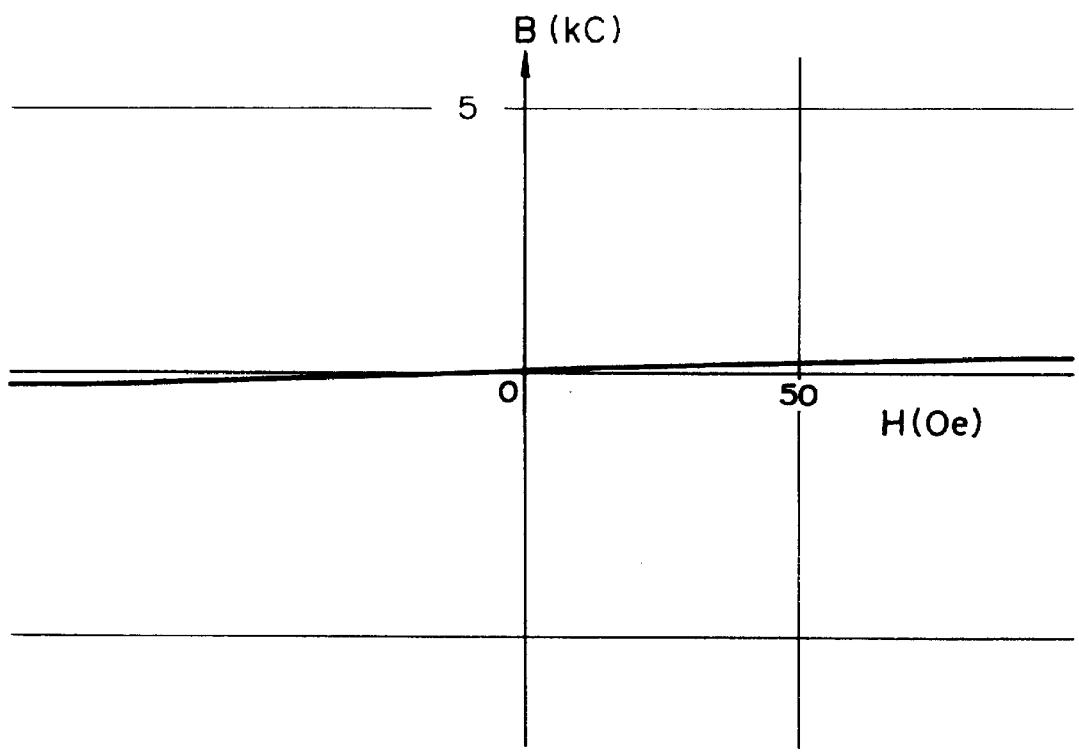
FIG. 6 shows a magnetic property (B-H curve) of a nonmagnetic portion of a rotor core of the invention which has 1.1 of maximum magnetic permeability ($\mu_s$) and, in which the unit of "B" is "kG" and the unit of "H" is

Also with regard to magnetic properties, the zone 660 subjected to the "remelting heat treatment" and the corresponding portion subjected to the "non-melting heat treatment" (which corresponds to the portion 663 in FIG. 11) were examined at room temperature of 20° C., which have the austenite structure, were examined. The result is shown in FIG. 6, which is a B-H curve. We can see from the graph that the both nonmagnetic portions or zones stated above have a relative magnetic permeability ($\mu$s) of about 1.1 at room temperature of 20° C., which fulfills the nonmagnetic property of $\mu s \leq 2$, and thus they can well restrain leakage flux in the invention rotating machine at the room temperature. It is noted that such relative magnetic permeability ($\mu$s) of about 1.1 is of excellent nonmagnetic property which is substantially equal to that of air.

Next, the both nonmagnetic portions or zones having austenite structure were immersed in a liquid methanol coolant for thirty minutes, which was adjusted to a temperature of from minus(-) 10° C. to minus(-) 60° C. by adding dry ice, in order to examine them regarding a temperature of transformation from austenite phase to ferrite phase. Thereafter, the both nonmagnetic portions or zones were drawn out from the coolant to turn those temperature up to the room temperature of 20° C. and those crystal structures were examined. Table 1 shows the experimental results.

TABLE 1

| Temperature (°C.) | Melting heat treatment (remolten/solidified zone 661) | Non-melting heat treatment (nonmelted zone 663) |
| --- | --- | --- |
| 20 | A | A |
| -10 | A | A |
| -20 | A | A |
| -30 | A | F |
| -40 | A | F |
| -50 | A | F |
| -60 | A | F |

*Note: A = Austenite phase, F = Ferrite phase

With respect to Table 1, it was confirmed that the "non-melting heat treatment" portion (which corresponds to the portion 663 in FIG. 11) was transformed from the austenite phase into the ferrite phase below minus(-) 20° C. It was also confirmed that a motor, whose rotor core corresponds to that of FIG. 2 and comprises the "non-melting heat treatment" portions (which corresponds to the portion 663 in FIG. 11) instead of the nonmagnetic zones 660, was deteriorated in the motor efficiency due to suddenly increased leakage flux in a temperature range of lower than minus(-) 20° C.

On the other hand, it was confirmed that the remolten/solidified zone 661 of the zone 660 subjected to the "remelting heat treatment" was stable and not transformed in its metal structure even at minus(-) 60° C. of temperature. It was also confirmed that the motor shown in FIG. 2, whose rotor core comprises the remolten/solidified zone 661 as the nonmagnetic zone, was good in the motor efficiency even at minus(-) 60° C. like as that at the room temperature (20° C.).

Regarding the heat-affected zone 662 which is a part of the nonmagnetic zone 660, it was also confirmed that the metal structure was transformed from the austenite phase to the ferrite phase in a temperature range of lower than minus(-) 20° C. like as the "non-melting heat treatment" portion (which corresponds to the portion 663 in FIG. 11) in Table 1.

Figure 8A:
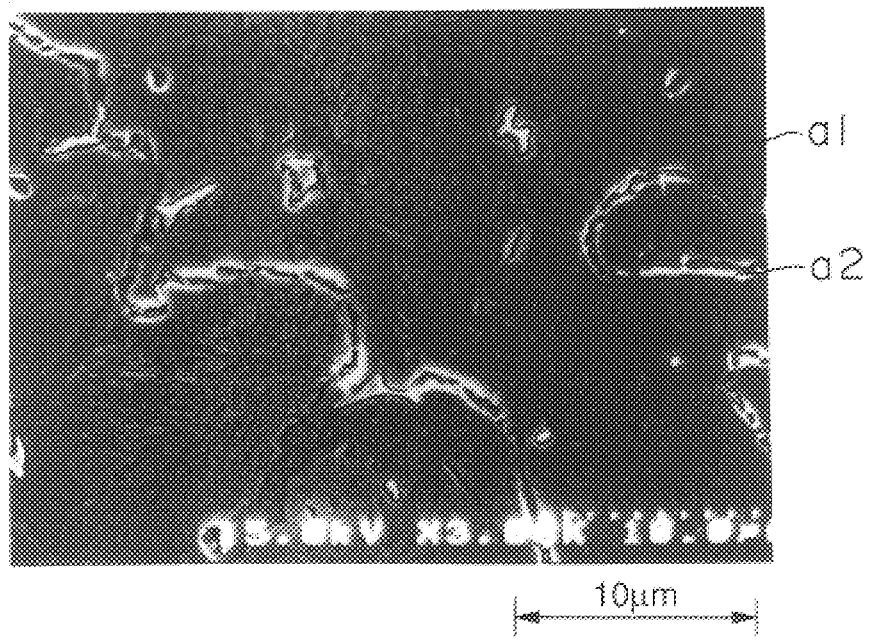
FIG. 8A is a photograph showing a microstructure of a remolten/solidified zone according to the invention, in which a1 denotes the matrix phase and a2 carbide particles.
Figure 8B:
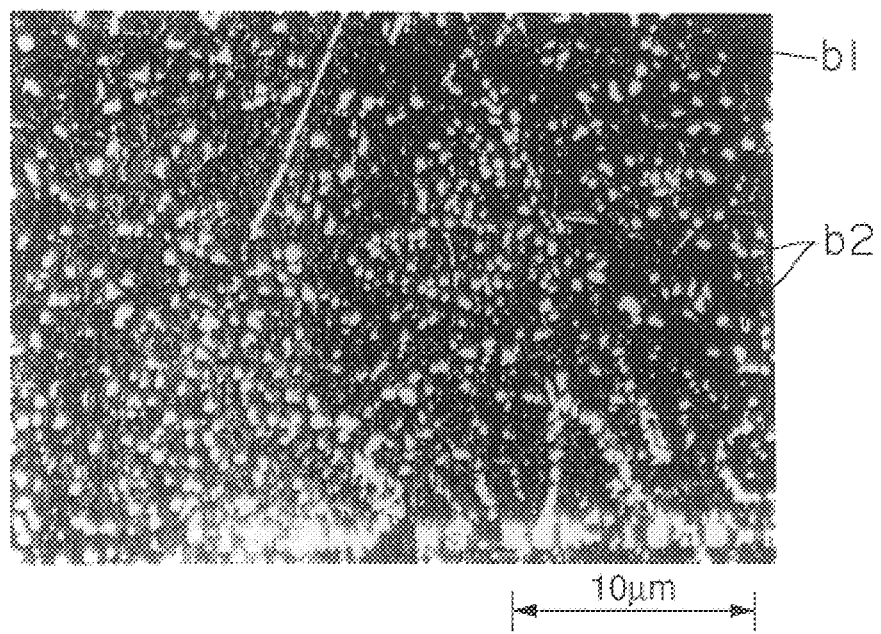
FIG. 8B is a photograph showing a microstructure of a merely heated/cooled zone according to the conventional way, in which b1 denotes the matrix phase and b2 carbide particles.

There are shown metal structures of the remolten/solidified zone 661 and the "non-melting heat treatment" portion (which corresponds to the portion 663 in FIG. 11) in FIGS. 8A and 8B, respectively, which were observed by means of an electron microscope. While, a few number of precipitated carbide particles can be observed from FIG. 8A, a large number of precipitated carbide particles can be observed from FIG. 8B. With regard to an occupation area size of the precipitated carbide particles in the respective whole areas of the microphotographs of FIGS. 8A and 8B, that of FIG. 8A (the remolten/solidified zone 661) is about $\frac{1}{40}$ of that of FIG. 8B (the "non-melting heat treatment" portion). As to grounds of this, it is believed that, in the case where the object thin steel plate is partially subjected to the "non-melting heat treatment" in order to make the treated zone nonmagnetic, already precipitated carbide can not be dissolved into the matrix, and that such precipitated carbide can be dissolved into the matrix only by means of the "remelting heat treatment" of the invention thereby the matrix can comprise an increased amount of effective carbon so that the austenite phase partially formed in the thin steel plate can be more stable so as to be maintained at least minus(-) 60° C. of temperature.

While, in FIG. 7, the volumetric rate of the remolten/solidified zone 661 and the nonmagnetic heat-affected zone 662 is 70% to 30%, in the view point of practical use in accordance with the present invention, preferably such rate is optionally chosen within a specific range.

Figure 12:
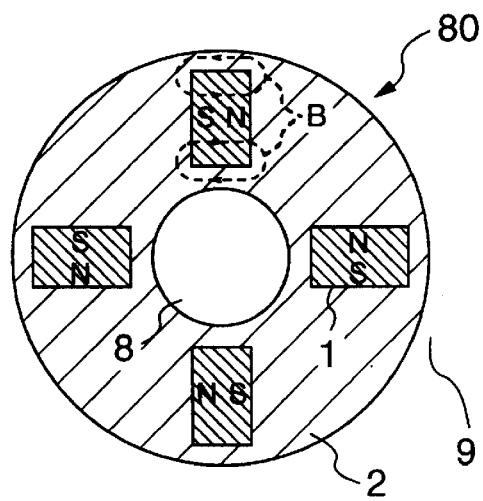
FIG. 12 is a cross sectional view of an essential portion of a conventional rotor.

For example, as to the rotating machine shown in FIG. 2, whose rotor core 10 has a plurality of nonmagnetic zones 660 each of which has 2 to 4 mm of width on the outer peripheral surface of the rotor core 10, if the volumetric rate of the remolten/solidified zone 661 and the nonmagnetic heat-affected zone 662 is changed, in the nonmagnetic zone 660, the rate of a width $W_{661}$ of the remolten/solidified zone 661 and a width $W_{662}$ of the nonmagnetic heat-affected zone 662 is naturally changed. In the case where the remolten/solidified zone 661 is less than 30 vol %, it will be hard to restrain the leakage flux B to occur at minus(-) 40° C. of temperature because the portions of the width $W_{662}$ are transformed from the nonmagnetic phase to a magnetic phase resulting in that the width $W_{661}$ of the remolten/solidified zones 661, each of which is the nonmagnetic zone adjacent to the air gap between the rotor core 10 and the stator core 20a (FIG. 2), may be equal or less to the respective distance of the above air gaps. Thus, it is practical for the remolten/solidified zone 661 to set its amount to be not less than 30 vol % so that the leakage flux B can be restrained at minus(-) 40° C. of temperature to about 30% of that in a conventional rotating machine having a rotor 80 shown in FIG. 12.

If the remolten/solidified zone is not less than 50 vol % in the nonmagnetic zone 660 (FIG. 2), the leakage flux B can be restrained at minus(-) 40° C. of temperature to about 10% of that in the above conventional rotating machine.

Further, if the remolten/solidified zone is not less than 70 vol % in the nonmagnetic zone 660 (FIG. 2), the leakage flux B can be restrained at minus(-) 40° C. of temperature to several percent (%) of that in the above conventional rotating machine.

It should be noted that it is actually impossible to form the nonmagnetic zone 660 only by the remolten/solidified zone 661 taking account of the thermal conductivity of the rotor core material and that the upper limitation of the volumetric amount of the remolten/solidified zone 661 in the nonmagnetic zone 660 should be appropriately determined taking into consideration that the remolten/solidified zone 661 cause the dimensional accuracy of the outer surface, which is adjacent to the air gap between the rotor core 10 and the stator core 20a (FIG. 2), of the rotor core 65 to deteriorate.

Figure 3:
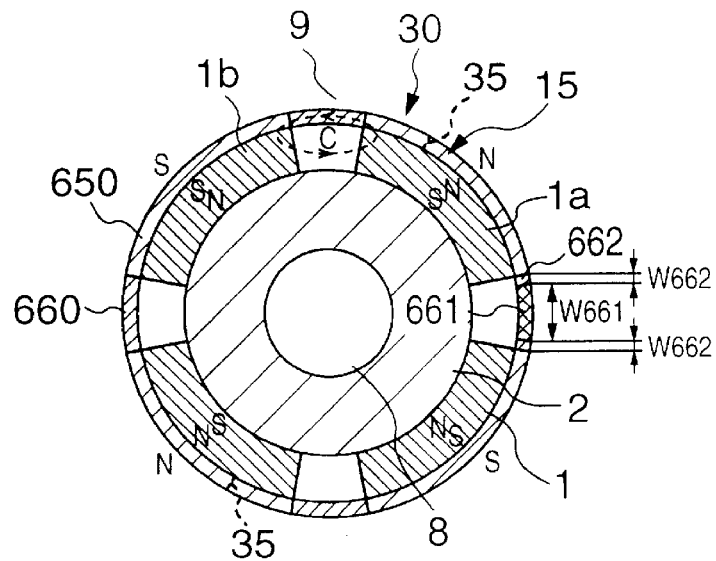
FIG. 3 is a cross sectional view showing an essential portion of another rotor of the invention.
Figure 11:
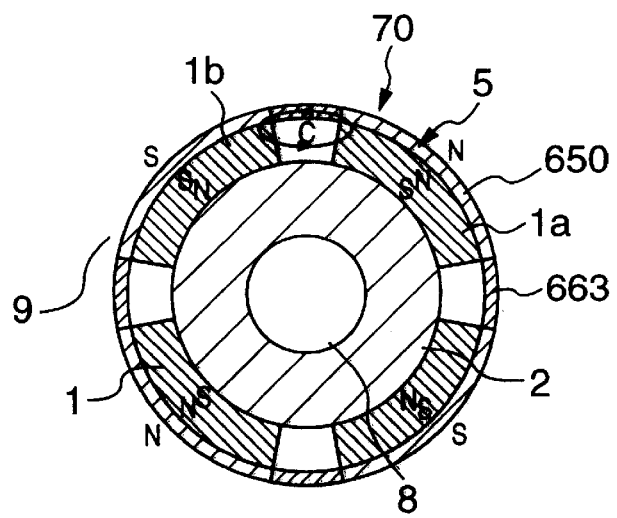
FIG. 11 is a cross sectional view of an essential portion of a conventional rotor.

Another embodiment of the invention rotating machine is shown in FIG. 3 which is a cross sectional view of an essential portion of the machine and in which the same reference numerals as those in FIG. 11 indicate identical components.

In FIG. 3, a rotor core 30 comprises a cylindrical cover 15 being formed from the above mentioned material which consists of ferromagnetic zones 650 and nonmagnetic zones 660 and which has a chemical composition of, by weight, 0.6% carbon, 13% Cr, and balance of Fe and unavoidable impurities. The nonmagnetic zones 660 are present at positions where leakage flux is produced between magnetic poles of permanent magnets 1. The cylindrical cover 15 had a thickness of 1 mm, and an air gap distance 9 between the cover 15 and a stator (not shown) was 0.5 mm.

According to the rotor core 30, the effective magnetic flux was increased by 10% in amount as compared with a rotor core which has the same structure and size as those of the rotor core 30 but whose cylindrical cover is made of an entirely nonmagnetic material. A motor according to the invention (not shown), which comprised the rotor core 30 having the cylindrical cover 15 consisting of the ferromagnetic zones 650 and the nonmagnetic zones 660, exhibited substantially the same good motor capacity even at minus(−) 60° C. as that at the room temperature (20° C.). Contrasting, a conventional motor, which comprised the rotor core 70 (shown in FIG. 11) having the cylindrical cover 5 comprising nonmagnetic zones 663 of the "non-melting heat treatment" portions, was notably deteriorated in the motor efficiency at a low temperature range of lower than minus(−) 20° C. due to greatly increased leakage flux.

Figure 4:
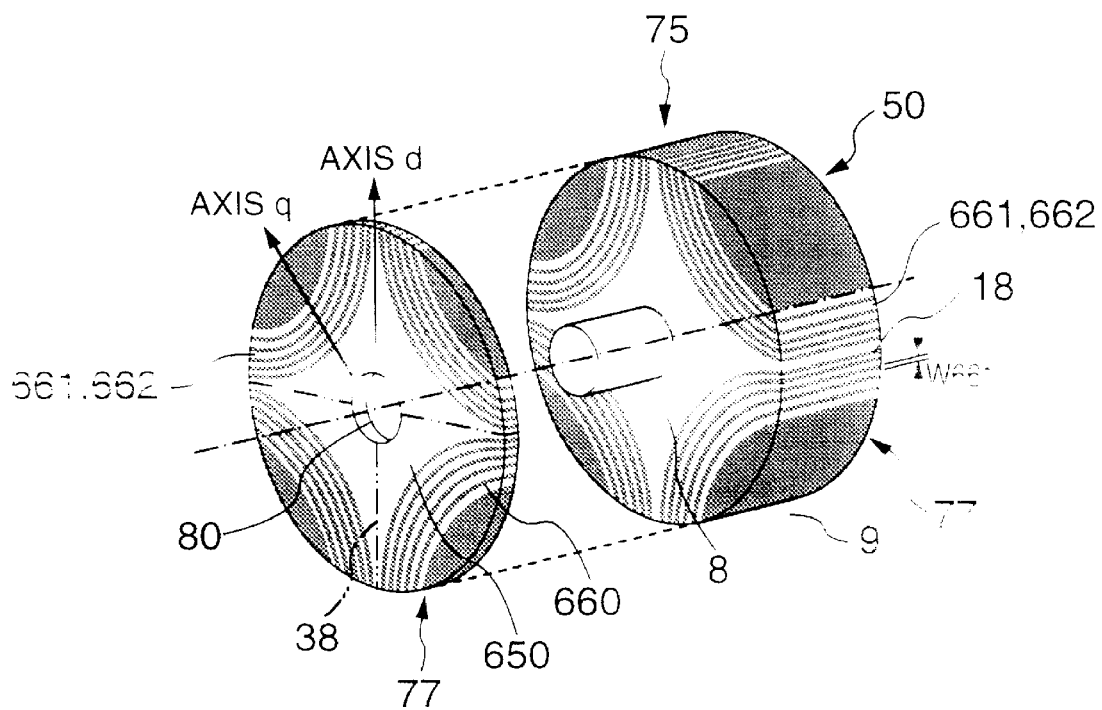
FIG. 4 is a perspective view showing an essential portion of another rotor of the invention.
Figure 13:
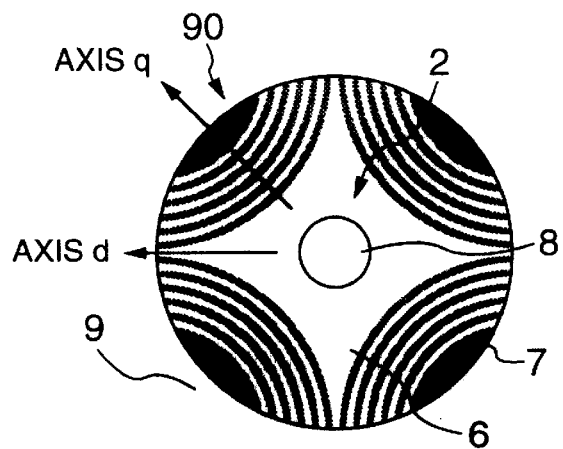
FIG. 13 is a cross sectional view of an essential portion of a conventional rotor.
Figure 14:
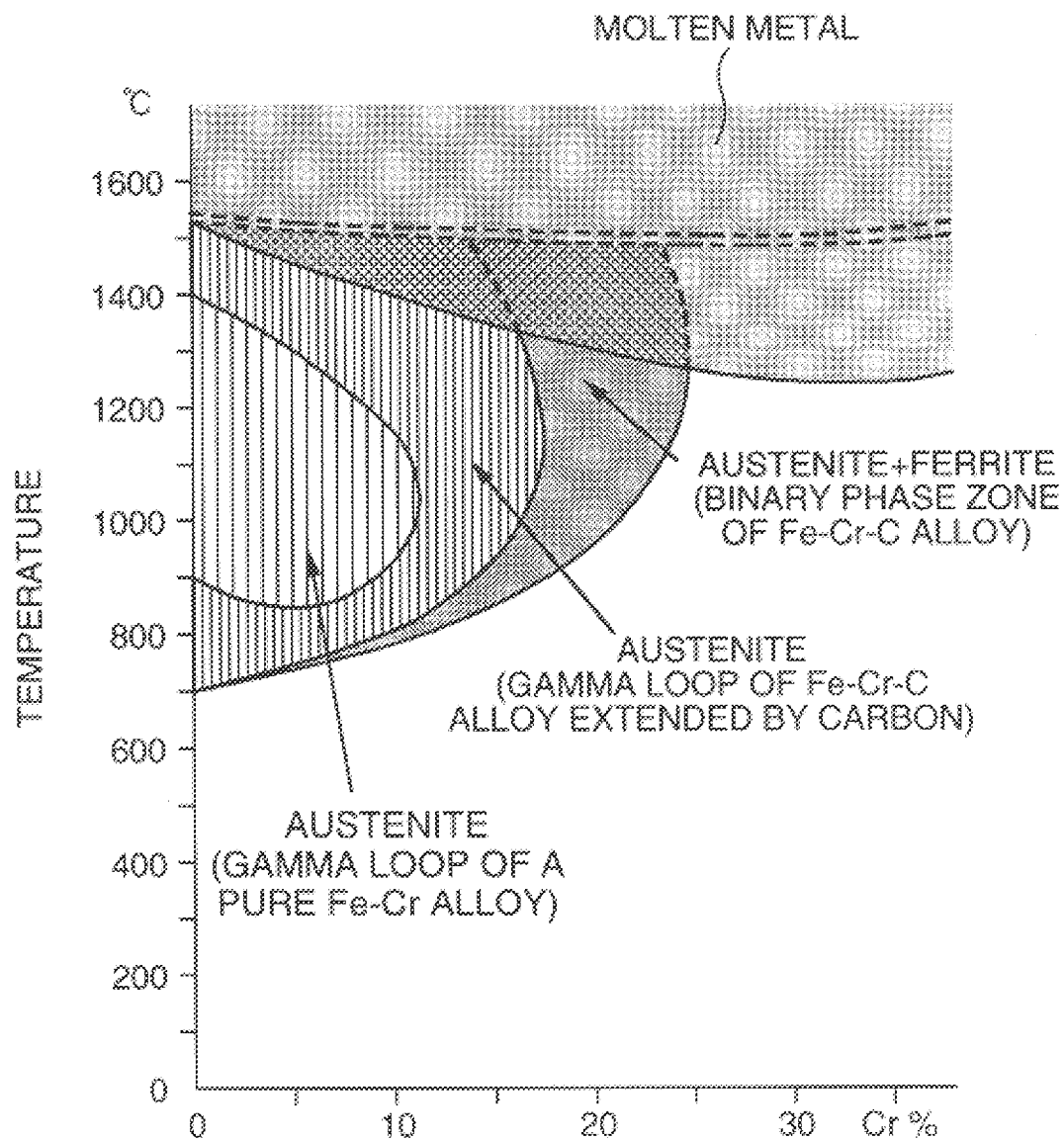
FIG. 14 is a phase diagram of a carbon modified Fe—Cr binary system at 0.6 wt %.

Still another embodiment of the invention rotating machine is shown in FIG. 4 which is a perspective view of an essential portion of the machine and in which the same reference numeral and characters as those in FIG. 13 indicate an identical component and objects.

A rotor core 50, which is a multilayer inner magnetic barrier type, was formed of a plurality of thin disk plates 77 each of which had a central through hole 80 and consisted of alternately layered ferromagnetic zones 650 and nonmagnetic zones 660 that were formed by means of the "remelting heat treatment" with utilization of $CO_2$ laser beam and which were superimposed and fixed with one another such that all of the ferromagnetic zones 650 and all of the nonmagnetic zones 660 of the thin disk plates 77 were, respectively, in alignment with one another. The rotor core 50 had a considerably good salient pole ratio ($\xi = Ld/Lq = 12$) which is defined as a ratio of an inductance at a direction along the axis "d" of easy magnetization to that at a direction along the axis "q" of hard magnetization. A reluctance motor (not shown) comprising the rotor core 50 exhibited substantially the same good motor capacity even at minus(−) 60° C. as that at the room temperature (20° C.). Contrasting, a conventional reluctance motor, which comprised the rotor core 2 (shown in FIG. 13) having the nonmagnetic zones 7 of the "non-melting heat treatment" portions which correspond to the nonmagnetic zones 663 (FIG. 11), was notably deteriorated in the motor efficiency at a low temperature range of lower than minus(−) 20° C. due to greatly increased leakage flux. Here, a further discussion is provided about the width of the nonmagnetic zone with regard to the rotor cores 30 and 50 (FIGS. 3 and 4).

Regarding the rotor core 30, it was confirmed that, in the case where the remolten/solidified zone 661 has 1 mm width ($W_{661}$) on its surface adjacent to the air gap 9 and the nonmagnetic heat-affected zones 662, also on its surface adjacent to the air gap 9, which exist on the both sides of the zone 661, and each of which has 1 mm width ($W_{662}$), the zones 661 and 662 constituting the nonmagnetic zone 660, the nonmagnetic heat-affected zones 662 were transformed to the magnetic phase at minus(−) 40° C. of temperature resulting in 1 mm width ($W_{661}$) of the nonmagnetic zone 660. In this case, if the width ($W_{661}$) of the nonmagnetic zone 660 is not more than a distance of the air gap 9 (for example, 1.0 mm), it will be hard to restrain the leakage flux C (FIG. 3). Thus, it is practical to produce the remolten/solidified zone 661 to have not less than 30 vol % in the nonmagnetic zone 660 in order to keep the width ($W_{661}$) of the remolten/solidified zone 661 in the cylindrical cover 15 larger than the distance of the air gap 9 at minus(−) 40° C. of temperature. This is the case, according to a rotating machine comprising the rotor core 30, it is possible to restrain an amount of the leakage flux to about 30% of that in the rotating machine comprising the conventional rotor core 70 (FIG. 11) at minus(−) 40° C. of temperature. If the remolten/solidified zone 661 is 50 vol % in the nonmagnetic zone 660, it is possible to restrain an amount of the leakage flux to about 10% of that in the rotating machine comprising the above conventional rotor core 70 at minus(−) 40° C. of temperature. In the case of not less than 70 vol % of the remolten/solidified zone 661, the above value may be several percent of that of the conventional rotating machine.

Also in a reluctance motor comprising the rotor core 50, in the case where the width ($W_{661}$) of the remolten/solidified zone 661 in the nonmagnetic zone 660 is less than a distance of the air gap 9 between the rotor core 50 and a stator (not shown), the alternating magnetic field passes not only along the axis "d" of easy magnetization but also along the axis "q" of hard magnetization resulting in decrease of the salient pole ratio ($\xi$). Thus, in order to keep the width ($W_{661}$) of the remolten/solidified zone 661 in the rotor core 50 larger than the distance of the air gap 9 at minus(−) 40° C. of temperature, it is preferable to produce the remolten/solidified zone 661 to have not less than 30 vol % in the nonmagnetic zone 660, more preferably not less than 50 vol % and most desirably not less than 70 vol %.

As stated above, the composite magnetic material for the rotor core of the invention rotating machine consists of the ferromagnetic phase and the nonmagnetic phase, wherein the ferromagnetic phase consists of the ferrite phase and carbide, the nonmagnetic phase is formed by partially remelting an initial or starting material having the ferromagnetic phase and subsequently solidifying the remolten portions, and wherein the nonmagnetic phase has a substantially identical chemical composition to the ferromagnetic phase, in other words, the nonmagnetic phase has a chemical composition which is within a variance range of that of the initial or starting material of the ferromagnetic phase. The ferromagnetic steel material used in the invention rotor core comprises an appropriate amount of Cr in order to ensure corrosion resistance and may comprise increased amounts of carbon and/or Ni to make the austenite phase stable. Since such alloying elements make the ferromagnetic steel material to be deteriorated in the maximum magnetic flux density (Bs), it is practical to set them to the amounts of, by weight, not more than 1.20% carbon, not more than 8.00% Ni and 12.00 to 14.00% Cr in order to keep not less than 0.8 T of maximum magnetic flux density (Bs) of the material, preferably not less than 1.2 T and more preferably not less than 1.3 T.

In the case of attaching importance to the maximum magnetic flux density (Bs) of the magnetic material, the afore mentioned magnetic stainless steel can be used, which corresponds to JIS SUS420J2. According to an rotating machine comprising the above rotor core which is made of such magnetic stainless steel, the rotor core can have stably the austenite phase of the nonmagnetic zone even in a low temperature range of about minus(−) 40° C. so that the rotating machine can have a good magnetic efficiency even at such low temperature.

Further, in the present invention, since the rotor core is provided with the nonmagnetic zone by means of the "remelting heat treatment", the rotor core has little strain and thus it has good machinability including punching.

Hereafter, some modifications will be described with respect to the embodiments shown in FIGS. 1, 2, 3 and 4.

The rotor core 65 shown in FIGS. 1 and 2 is produced by superimposing a plurality of the thin disk plates 67 with one another such that all of the ferromagnetic zones and all of the nonmagnetic zones of the thin disk plates 67 are, respectively, in alignment with one another. Alternatively, for example, the thin disk plate 67 may consist of four separate sections as indicated by phantom lines 31 (FIG. 1). Such divided separate sections can be made such that each separate section comprises both of the ferromagnetic zone 650 and the nonmagnetic zone 660, and the number of the divided sections can be appropriately determined taking account of designing and fabricating conditions of the rotor core. On the other hand, it is not always needed that the rotor core 65 is formed from a plurality of thin plates but also it may be made of a single bulk material which comprises the ferromagnetic zone 650 and the nonmagnetic zone 660 like as the rotor core shown in FIG. 1.

While the cylindrical cover 15 of the rotor core 30 shown in FIG. 3 is made of a single member, alternatively, for example, it may consist of two separate sections as indicated by dotted lines 35 (FIG. 3). Such divided separate sections can be made such that each separate section comprises both of the ferromagnetic zone 650 and the nonmagnetic zone 660, and the number of the divided sections can be appropriately determined taking account of designing and fabricating conditions of the rotor core.

While the rotor core 75 shown in FIG. 4 is produced by superimposing a plurality of the thin disk plates 77 with one another, each of which is made of a single member, alternatively, for example, the thin disk plate 77 may consist of four separate sections as indicated by phantom lines 38 (FIG. 4). Such divided separate sections can be made such that each separate section comprises both of the ferromagnetic zone 650 and the nonmagnetic zone 660, and the number of the divided sections can be appropriately determined taking account of designing and fabricating conditions of the rotor core. On the other hand, it is not always needed that the rotor core 75 is formed from a plurality of thin plates but also it may be made of a single bulk material which comprises the ferromagnetic zone 650 and the nonmagnetic zone 660 like as the rotor core shown in FIG. 4.

For the permanent magnet used in the present invention, those conventional are available. On the other hand, it is preferred that the permanent magnet has a residual magnetic flux density (Br) of not less than 0.8 T, more preferable not less than 1.0 T and most preferable not less than 1.2 T.

The permanent magnet embedded in the inner magnet type rotor is not limited to such rectangular shape shown in FIG. 1 but is capable of an arc segment, a plate, a form having a semicylindrical cross section and so on which can be embedded in the rotor core.

The other permanent magnet installed in the surface magnet type rotor which has the cylindrical cover is not limited to such a shape shown in FIG. 3 but is capable of an integrally formed single ring magnet.

It should be noted that the rotors of the invention rotating machine is not limited to having the number of magnetic poles and the size raised in the embodiments. While such conditions can be appropriately determined in accordance with application purposes, the invention rotors have most appropriately from four to one hundred number of magnetic poles.

Further, while the respective embodiment rotors of the invention rotating machine have symmetrically arranged magnetic poles on the peripheral surface side, an asymmetrical arrangement thereof is also acceptable.

As will be apparent from the above, according to the present invention, the following advantages can be obtained.

a) The rotating machine has a high effective flux amount at a low temperature range.

b) Since the rotating machine comprises the rotor core or the cylindrical cover which consists of the ferromagnetic phase and the nonmagnetic phase and is made of a single material, the ferromagnetic phase having a maximum magnetic flux density (Bs) which is enough to introduce magnetic flux from rare earth element type magnets to the stator with a high efficiency and the nonmagnetic phase being stable even in a low temperature range, the rotating machine is improved in efficiency of using effective flux of the permanent magnets and also significantly improved in the effective flux amount thereof in a low temperature range.

c) The reluctance type rotating machine of the invention comprises the inner magnetic barrier type multilayered rotor core can be simple in structure and has a high reliability, since the rotor core consists of the ferromagnetic phase and the nonmagnetic phase and is made of a single material, the ferromagnetic phase having a high maximum magnetic flux density (Bs) and the nonmagnetic phase being stable even in a low temperature range.

What is claimed is:

1. A permanent magnet field type rotating machine comprising an inner magnet type rotor whose rotor core has a plurality of permanent magnets mounted therein, wherein said rotor core is made of a single chemical composition material comprising ferromagnetic and nonmagnetic zones, said nonmagnetic zones including a remolten and solidified metal structure and a non-melting heat treatment metal structure, and being present at portions of said rotor core where leakage flux is produced.

2. A permanent magnet field type rotating machine according to claim 1, wherein said nonmagnetic zones comprise not less than 30 vol % of remolten and solidified metal structure.

3. A permanent magnet field type rotating machine having a surface magnet type rotor which comprises a rotor core, permanent magnets mounted on the peripheral surface of said rotor core and a cylindrical cover which covers said permanent magnets, wherein said cylindrical cover is made of a single chemical composition material comprising ferromagnetic and nonmagnetic zones, said nonmagnetic zones including a remolten and solidified metal structure and a non-melting heat treatment metal structure, and being present at portions of the cylindrical cover where leakage flux is produced.

4. A permanent magnet field type rotating machine according to claim 3, wherein said nonmagnetic zones comprise not less than 30 vol % of remolten and solidified metal structure.

5. A reluctance type rotating machine having a rotor which comprises a rotor core being made of a single chemical composition material comprising ferromagnetic and nonmagnetic zones, said nonmagnetic zones including a remolten and solidified metal structure and a non-melting heat treatment metal structure.

6. A permanent magnet field type rotating machine according to claim 5, wherein said nonmagnetic zones comprise not less than 30 vol % of remolten and solidified metal structure.

* * * * *